Patented May 25, 1943

2,320,126

UNITED STATES PATENT OFFICE 2,320,126

PREPARATION OF COATING COMPOUND FROM DRYING OIL AND PHENOL-ALDEHYDE RESINS

Charles H. Groff, Crafton, and Wilbur W. Castor, Mount Lebanon, Pa., assignors to Stoner-Mudge, Inc., a corporation of Pennsylvania No Drawing. Application October 4, 1941, Serial No. 413,698

4 Claims. (Cl. 260—19)

This invention relates to improvement in methods of making coating compounds for application to metal, wood, ceramic, stone, and other bodies, and consists in grinding together (with proper control of temperature) an alkaline-condensed, unmodified, heat-and-oil-reactive, phenolic resinoid and a drying or a semi-drying oil or a mixture of such oils, and in so doing effecting reaction between the resinoid and the oil. Granular pigment may be included in the mill charge, and the invention finds particular application in the preparation of pigmented coating compositions adapted to be applied by knifing, calendering, flowing while hot, and hot spraying, under conditions where complete freedom from volatile diluents and solvents is imperative. Pigmented compositions so prepared are of peculiar utility in application to the interior surfaces of cast-iron pipe, of chemical stoneware vessels of constricted opening, of steel and wooden tanks, of drums and similar containers, where the circumstances are so far preventive of the removal of solvent from solvent-containing compositions as to constitute a practical barrier to the use of such compositions.

This application is a continuation in part of an application filed by us December 1, 1939; Serial No. 307,126.

It is an object of this invention to prepare oil-modified, heat-reactive, phenolic resin reaction intermediates containing desired pigments, but free from volatile solvents and diluents, adapted to be applied by knifing, by calendering, by hot rolling, or by hot spraying and thereafter to be subjected to heat in order to complete the resinifying reaction.

A further object of the invention is the preparation of reaction products between heat-reactive phenolic resinoids and drying and/or semi-drying oils in the presence of pigments and in the absence of volatile solvents and diluents.

Another object of the invention is the preparations of reaction products between heat-reactive phenolic resinoids and drying and/or semi-drying oils, without the necessity of cooking them together according to the usual varnish-kettle procedures of the prior art.

Another object of the invention is the preparation of pigmented, oil-modified, heat-reactive, phenolic resin compositions, free from volatile solvents and diluents, in a single step, starting with pigment, phenolic resinoid, and drying or semi-drying oil.

These objects may be attained, and the invention lies, in the process of mechanically mixing, without the aid of any solvent, an alkaline-condensed, unmodified, heat-and-oil-reactive, phenolic resinoid, a drying or semi-drying oil or mixtures of these, and pigment or pigments, and thereafter grinding the mixture on a suitable roll mill or buhrstone mill, whereby, under the influence of pressure and high internal friction, the heat necessary to initiate the reaction is generated, and reaction takes place between the oils and the phenolic resinoid; while the excess heat (generated once the reaction is in progress) is carried away, and rise in the temperature of the material under treatment is restrained and limited. There results a pigmented, oil-modified, heat-reactive, phenolic resin composition, free from volatile solvents and diluents, adapted to be applied in the absence of volatile solvents and diluents, as a coating to surfaces of such articles as have been named, and the coating is susceptible to ultimate resinification by making.

In the usual preparation of oil-modified, heat-and-oil reactive, phenolic resin compositions containing pigment, it is customary to take an oil-soluble, heat-reactive, phenol-aldehyde reaction product, the typical preparation and composition of which will be later described, and to heat it in a suitable container, such as a varnish kettle, together with a drying oil, a semi-drying oil, or mixtures of such oils, at temperatures up to and exceeding 400–500° F. for a period of time varying from several minutes to twenty-four hours or even longer (depending upon the particular phenolic resinoid and oil selected), until chemical reaction between the oil and the resinoid has taken place to an extent that the mixture, on testing of withdrawn samples, is shown to be homogeneous and soluble in typical solvents for oils and oil-modified resins, such as mineral spirits, xylol, petroleum, naphtha, and the like. As soon as the reaction has been advanced to this stage, the mixture is diluted and cooled or "chilled back" by pouring in a solvent or mixture of solvents and diluents, such as petroleum spirits, solvent naphtha, aromatic hydrocarbons, and the like, until the oil-modified phenolic resin concentration lies in the range of 50 to 70 per cent by weight. The resulting clear solution in volatile solvents is a typical oil-modified phenolic resin varnish, and to it there may subsequently be added pigments of the type familiar to the art. The pigment is incorporated by grinding, typically in a chilled ball mill or on a roll mill with cooled rolls. Since in the process of grinding certain of the volatile constituents are inevitably lost, the solution tends to concentrate. A deleterious result of this prior-art procedure lies in the fact that long-continued grinding, which leads to superior pigment dispersion, is fraught with the danger that the heat-reactive, oil-modified resin, completely dispersed as it is in solvent, and thus of high liquidity, may flow out over the rolls or over the surface of the milling stones and become exposed to the oxygen of the air, whereby further "conversion" or final-stage reaction takes place prematurely, and the resulting mixture becomes insoluble, infusible, and useless. Another disadvantage attendant upon the prior-art process described lies in the fact that the resulting pigmented composition is diluted with volatile solvents and diluents; and, accordingly, any process of spreading this composition upon a surface to be coated must take into account the necessity for insuring complete removal of these volatile constituents before the final reaction of "converting" or "setting" is advanced—else a portion of the volatile constituents may become trapped in the film of solidifying pigmented resin, with formation of bubbles, blow holes, cracks, and interstices; and thus, being present, completely ruin the desired protective effect of the "set" film. Accordingly, it is necessary to exercise extreme precautions in adjusting the ratios of pigment to resin, and of resin to solvent, in order to insure even minimum freedom from the deleterious actions accompanying solvent release; and in practice the ideal end of a reactive composition, entirely free from these difficulties, has never yet been attained.

We have specified as the principal material an unmodified, heat-and-oil-reactive, phenolic resinoid; and our process involves the bringing about of a chemical reaction between this phenolic resinoid and a drying oil, semi-drying oil, or mixtures of these, while milling the resinoid and the oil together, and pigments with them—all in the absence of volatile solvent or diluent. And we find specifically suited to our purpose those oil-soluble, heat reactive, alkaline-condensed, resinous intermediate reaction products between aldehydes and phenols which are preferably substituted in the ring with aliphatic or alicyclic hydrocarbon radicals and hydroxy-substituted and halogen-substituted aliphatic or alicyclic hydrocarbon radicals containing at least three saturated carbon atoms but no more than a total of twelve carbon atoms in the substituent hydrocarbon radicals; and unmodified with ester gum, resin, natural resin acids, and the like. These resinoids, as is well known, result from the controlled condensation of phenol and certain nuclear substituted phenols with aldehydes, such as formaldehyde, acetaldehyde, benzaldehyde, furfuraldehyde, and the like, under the influence of alkaline catalysts such as ammonia, alkali hydroxides and carbonates, aniline, triethanolamine, morpholine, and similar bases. The substituted phenols which are generally employed consist of the alkyl and hydroxy or halogen-substituted alkyl phenol derivatives; exemplary are the cresols, the xylenols, and p-substituted products, typically, 4-4'-dihydroxy diphenyl propane and 4,4'-dihydroxy-3,3'-dimethyl diphenyl cyclohexane, such as are described, for example, in British Patents 467,081, 467,112, 467,234, and 465,412.

In the claims hereinafter detailed, by "unmodified, oil-soluble, alkaline condensed, heat-and-oil-reactive, resinous phenol-aldehyde reaction intermediates" we mean to characterize only those phenolic resinous compositions specified above.

Illustrative commercially available resins of the type contemplated are the following:

| Resin | Chemical constitution | Supplier |
|---|---|---|
| Bakelite XR-10282 Bakelite BR-3360 | Alkali catalyzed o-phenyl phenol and formaldehyde. | Bakelite Corp. |
| Amberol ST-137 | Alkali catalyzed p-sec. octyl phenol+formaldehyde. | Resinous Products & Chemical Co. |
| Varcum 810A | Alkali catalyzed p-tert. butyl phenol+formaldehyde. | Varcum Chemical Corp. |
| Beckacite 1001 | Alkali catalyzed mixed alkyl-substituted phenols+formaldehyde. | Reichold Chemicals, Inc. |

The reactive drying and semi-drying oils which we incorporate into the unmodified phenolic resins are well known, and are selected from a group consisting of China-wood oil, linseed oil, oiticica oil, perilla oil, menhaden oil, dehydrated castor oil, soya-bean oil, rapeseed oil, dehydrated cottonseed oil, tomato-seed oil, sardine oil, and similar drying oils. In the ensuing claims, by "drying oil" we mean to include both drying and semi-drying oils, and mixtures of these.

Pigments which may be incorporated into the reacting complex of phenolic resin and drying oil are well known to the prior art. They are solid substances, ordinarily metallic compounds, susceptible to pulverization, and include titanium dioxide, zinc oxide, red lead, lead chromate, iron oxide, lead carbonate, barium oxide, zinc sulphide, lithopone, antimony oxide, graphite, Spanish oxide, and the like. If desired, small proportions of the usual driers may also be added, especially when semi-drying oils have been employed in reaction with the phenolic resin.

The process whereby the unmodified phenolic resin is reacted with the drying oil or mixture of oils in the presence of the desired pigments consists of mixing 70 to 10 parts of pulverized resin with 30 to 90 parts of oil in a suitable container until a slurry is formed, and thereafter adding the pigment in any desired amount, depending upon the ultimate requirements in pigmentation. The slurry of resin, oil, and pigment is then transferred directly to the grinding mill, typically a three-roll mill, or buhrstone mill, and thereafter is ground on the mill. The friction of grinding generates heat sufficient to induce reaction between the resin and the oil; and the reaction, once begun, is attended by the release of yet more heat and by some frothing and evolution of water. We have found it essential to our ends—that is to say, to the production of a liquid product that, without the aid of solvent may, for example, be sprayed upon the inner surface of a stoneware jug and there matured by baking—that the temperature of the material be restrained, that the temperature rise be not allowed to exceed one hundred degrees Fahrenheit above room temperature (substantially 175° F.), and the grinding operation is accordingly controlled to that end. It may readily be achieved by grinding in the familiar three-roll mill equipped with water-cooled rolls. When, so proceeding, reaction has terminated, a smooth, homogeneous paste flows on the rolls. The entire reaction is completed in no more than five passes through the mill. The product is then transferred to suitable containers for shipment or storage, in the usual manner.

We have not specified a time of grinding, since this will be completely dependent upon the size of the batch being fed to the roll mill or buhrstone mill. For a five-pound batch, the time for a single passage through a roll mill is approximately 10-15 minutes; the time may be somewhat longer, not exceeding 20 minutes, for a burhstone mill. If the batch size be larger, there is a corresponding longer time for one complete passage through the mill, as will readily be understood. Thus, we prefer to define our reaction times in terms of the number of passes through the mill required to produce the desired end product.

For all practical purposes, the cessation of temperature rise and the manifest homogeneity of the flowing paste serve as satisfactory criteria for determining the end point of the reaction, and no advantage is gained in carrying the reaction beyond this point. On the contrary, continued passing of the now homogeneous paste through the rolls may lead to excessive further reaction, with accompany gellation, oxidation, and instability on storage. For close control of the extent of reaction we prefer to withdraw small samples from time to time, and to determine the solubility behavior at 50% solids concentration in a mixture of equal parts of xylol and mineral spirits. An incompletely reacted sample gives a cloudy, easily settleable dispersion in this solvent mixture, with the unreacted resin appearing as discrete agglomerates; a completely reacted product gives a clear, non-settling solution after 10 minutes in the cold, after coarse filtration to remove suspended pigment. And we prefer to terminate the reaction on the rolls when a 5-gram sample diluted with 5 grams of a solution of equal parts of xylol and mineral spirits is just homogeneous and clear under the above conditions of test. Similarly, microscopic examination of small samples pressed between two glass slides will sharply reveal the transition from mere mechanical mixture of resin, pigment, and oil to homogeneous dispersion of pigment in a vehicle of oil-modified resin. The change in refractive index is marked; disappearance of discrete unmodified resin particles is easily observed at the desired end point of the reaction. Finally, small samples may be spread upon 30-gage tinplate panels at coating weights approximating 10 milligrams per square inch and thereafter baked for 5-15 minutes at temperatures approximating 350-400° F. After the desired end point has been reached, the resulting baked-out films will be of uniform color and homogeneous appearance, free from blisters and discrete particles of resin and pigment agglomerates, and will be sufficiently flexible to withstand bending through an arc of 180° around a $\frac{1}{8}$ inch mandrel. Incompletely reacted samples, on the contrary, after baking out, will have a mottled color (visible evidence of segregation of discrete resin particles, and of burning and carbonization of unreacted oil), many blisters and pock-marks, and the film will be brittle.

It will be perceived that herein is found a process for producing in one step pigmented, oil-modified, phenolic resin compositions free from volatile solvents and diluents, unknown to the prior art, capable of being spread upon wood, ceramic, metal, stone, and other bodies and thereafter baked, whereby a final and completing reaction is effected and a "converted" integral coating results, free from the ill effects of solvent-containing coating compositions, adapted to be applied to closed or restricted surfaces, and of great utility in the art.

The following specific examples will serve to illustrate our invention. It will be understood throughout that the proportions and materials given are preferred, but are not necessarily limiting, except insofar as such limitations are specified in the appended claims.

EXAMPLE 1

To 450 grams of powdered alkali-catalyzed orthophenol phenol-formaldehyde reaction product were added with stirring 450 grams of raw China-wood oil, and thereafter 900 grams of Surfex ($CaCO_3$) pigment. The resulting slurry was transferred directly to a three-roll mill having water-cooled rolls and was passed five times through the mill. The average temperature on the rolls at the conclusion of the grind reached 140° F., the temperature continuing to rise during four passes, and remained substantially constant during the fifth pass. The product was then removed from the mill, spread on 28-gage bright steel at a coating weight of 50-60 milligrams per square inch, and thereafter baked 15 minutes at 400° F. The resultant "converted" pigmented phenolic coating possessed great durability, toughness, chemical resistance, adhesion, and a high degree of flexibility; it was completely free from such bubbles, pinholes, and similar imperfections as usually are associated with solvent-deposited films of this high coating weight.

EXAMPLE 2

Materials

| | Grams |
|---|---|
| Alkali-catalyzed p-secondary octylphenol-formaldehyde reaction product | 450 |
| Oiticica oil | 675 |
| Celite-165 ($SiO_2$) pigment | 450 |

The same procedure as described under Example 1 was followed throughout. The resulting product was spread on tinplate at a coating weight of 30-40 milligrams per square inch, and thereafter baked 20 minutes at 375° F. The baked coating possessed high durability, toughness, satisfactory chemical resistance, and adequate adhesion; it was completely free from pinholes, wrinkles, cracks, and pock-marks, such as are usually associated with solvent deposited films of this high coating weight.

EXAMPLE 3

Materials

| | Grams |
|---|---|
| Alkali-catalyzed p-tertiary butyl phenol-formaldehyde reaction product | 450 |
| Perilla oil | 450 |
| Iron oxide yellow | 450 |

The same procedure described under Example 1 was followed, except that only three passes through the mill were employed. The resulting product was spread upon 30-gage bright steel at a coating weight of 10-15 milligrams per square inch and thereafter baked 8 minutes at 415° F. The coating was entirely free from blisters, pinholes, and other imperfections, and had unusually high gloss, in addition to adequate toughness, mar resistance, and chemical inertness.

EXAMPLE 4

*Materials*

| | Grams |
|---|---|
| Alkali-catalyzed orthophenyl phenol-formaldehyde reaction product | 450 |
| Dehydrated castor oil | 450 |
| Spanish oxide (iron oxide) pigment | 225 |
| Asbestine (aluminum silicate complex) pigment | 225 |

The same procedure as described under Example 1 was followed, except that the grind was made on a buhrstone mill. A total of five passes through the mill was employed. The resulting film, hot-sprayed on cast-iron pipe stock, at a weight of 30–40 milligrams per square inch, was baked 20 minutes at 400° F. The coating possessed excellent water resistance, high chemical inertness, adequate adhesion, and good flexibility and toughness. It was free from the type of imperfections that usually characterizes solvent-deposited phenolic coatings.

EXAMPLE 5

The composition of Example 1 was prepared, and the usual procedure was followed, except that the grinding was accomplished on a five-roll mill. Three passes through this mill sufficed to give a product which, flowed on steel at a weight of 50 milligrams per square inch, and thereafter baked 15 minutes at 375° F., yielded a film free from the usual imperfections associated with solvent-deposited coatings, and possessed of excellent toughness, chemical resistance, shock resistance, and general durability.

And now, having completely described our invention, and having pointed out the advantages attendant with its use, we claim as our invention:

1. The method herein described of preparing an incompletely resinified coating compound free of volatile solvent, capable of being spread and of being thereafter completely resinified under heat, which consists in milling together in pure state, in the absence of volatile solvent or diluent, with reaction, and under heat-dissipating conditions and with a temperature rise to a peak of substantially 175° F. a drying oil and an unmodified, oil-soluble, alkaline-condensed, heat-and-oil-reactive, resinous phenol-aldehyde reaction intermediate.

2. The method herein described of preparing an incompletely resinified coating compound free of volatile solvent, capable of being spread and of being thereafter completely resinified under heat, which consists in milling together in pure state, in the absence of volatile solvent or diluent, under heat-dissipating conditions and with a temperature rise to a peak of substantially 175° F., a drying oil, an unmodified, oil-soluble, alkaline-condensed, heat-and-oil-reactive, resinous phenol-aldehyde reaction intermediate, and pigment material, whereby in the milling the first two substances named are reacted and a homogeneous product is obtained, in which homogeneous product the pigment is uniformly dispersed.

3. The method herein described of preparing an incompletely resinified coating compound free of volatile solvent capable of being spread and of being thereafter completely resinified under heat, which consists in milling together in pure state, in the absence of volatile solvent or diluent, with reaction, and under heat-dissipating conditions and with a temperature rise to a peak of substantially 175° F., a drying oil and an unmodified, oil-soluble, alkaline-condensed, heat-and-oil-reactive, resinous phenol-aldehyde reaction intermediate, with a pulverizable pigment material included in the mill charge.

4. The method herein described of preparing an incompletely resinified coating compound, free of volatile solvent, capable of being spread and of being thereafter completely resinified under heat, which consists in subjecting a mixture of a drying oil and an unmodified, oil-soluble, alkaline-condensed, heat-and-oil-reactive, resinous phenol-aldehyde reaction intermediate to no more than 5 passes between the water-cooled rolls of a grinding mill with temperature rise to a peak of substantially 175° F. and with reaction between the components of the mixture.

CHARLES H. GROFF.
WILBUR W. CASTOR.